US005897649A

United States Patent [19]
Kennedy

[11] Patent Number: 5,897,649
[45] Date of Patent: Apr. 27, 1999

[54] INTERACTIVE FORMULA PROCESSING SYSTEM FOR SQL DATABASES

[75] Inventor: Sargent L. Kennedy, Pleasanton, Calif.

[73] Assignee: Peoplesoft, Inc, Pleasanton, Calif.

[21] Appl. No.: 08/978,207

[22] Filed: Nov. 25, 1997

Related U.S. Application Data

[63] Continuation of application No. 08/547,255, Oct. 24, 1995.

[51] Int. Cl.[6] ....................................................... G06F 3/00
[52] U.S. Cl. ............................ 707/538; 345/339; 345/348
[58] Field of Search .................................. 707/3, 4, 102, 707/530, 538; 345/333, 334, 339, 348

[56] References Cited

U.S. PATENT DOCUMENTS

| | | | |
|---|---|---|---|
| 5,251,292 | 10/1993 | Martel, Jr. et al. | 707/538 |
| 5,265,246 | 11/1993 | Li et al. | 707/4 |
| 5,285,400 | 2/1994 | Stent et al. | 364/709.14 |
| 5,418,902 | 5/1995 | West et al. | 364/710.08 |
| 5,519,859 | 5/1996 | Grace | 707/3 |
| 5,526,475 | 6/1996 | Razdow | 707/538 |
| 5,572,642 | 11/1996 | Nasu | 345/418 |
| 5,600,833 | 2/1997 | Senn et al. | 707/1 |

OTHER PUBLICATIONS

Kimura et al., "Form/Formula A visual programming paradigm for user–definable user interfaces", Computer Magazine, Mar. 1995, vol. 28, issues 3, pp. 27–35.

Russo et al., "An user–friendly environment for the generation of highly portable software . . .", Instrumentation+ Measurement Technology Conference, 1990, pp. 320–324.

*Primary Examiner*—Stephen S. Hong
*Attorney, Agent, or Firm*—Raymond E. Roberts; Michael J. Hughes

[57] ABSTRACT

A system (10) for programming and performing applications programs in computer systems (70) using data in Structured Query Language ("SQL") data bases (32). Formulas (16) representing user defined tasks are constructed out of a formula sequence (18) of formula steps (20). Individual formula steps (20) are defined out of operand tokens (22 and 26), operation tokens (24), and result tokens (28). Operand tokens (22, 26) and result tokens (28) represent constants, variables, or SQL business objects, while operation tokens (24) represent precompiled members of a code modules library (36) that are capable of carrying out basic mathematical and data transfer operations on such operands (22, 26). Executing a formula (16) programmed with the system (10) in a computer system (70) is accomplished by dynamic allocation of resources such as memory work area (42), and loading operand token (22, 26) represented data along with the operation token (24) represented pre-compiled code of formulas (16) into the work area (42) where a processor (72) in the computer system (70) executes on the work area (42) contents and places the results into variables or into the SQL data base (32).

6 Claims, 5 Drawing Sheets

INTERACTIVE FORMULA PROCESSING SYSTEM FOR SQL DATABASES

This is a continuation of copending application Ser. No. 08/547,255 filed on Oct. 24, 1995.

TECHNICAL FIELD

The present invention relates generally to systems for programming and performing applications programs in computers, and more particularly to systems permitting computer users to easily and without extensive computer programming experience enter and run such applications programs. It is anticipated that the primary use of this invention will be to permit unsophisticated computer users to rapidly create and modify business applications that use the contents of structured query language ("SQL") data bases.

BACKGROUND ART

Software for most applications is created by software specialists, rather than by specialists in the respective applications which the software is ultimately used to perform. Two reasons for this are that programming tools are both difficult to learn and to use, thus creating heavy educational and intellectual burdens for prospective computer programmers. Today, many software users begrudgingly accept that software development is too difficult and too expensive to undertake unless one specializes in it. Further, paralleling this software creation problem has been a software maintenance problem, where often even the simplest of software modifications to accommodate a change in business practices is typically too expensive and time consuming to be practical.

Most computer users purchase packaged software, rather than develop it themselves. The vendors that supply such packaged software are generally "middle people," obtaining their stock of merchandise from "software houses" which employ teams of specialist programers, who actually write and debug the software "code." To benefit from economies of scale, consistent with standard marketing practice in most industries, the parties along this software chain of supply strive to create or stock generic sets of programs, and code modules for creating programs, to sell to the broadest possible customer base while incurring the lowest possible operating expenses, of which customer service is generally acknowledged to be one of the highest.

For software users the result of the current software creation and supply system has been pressure to standardize their computerized business practices around what is available in generic software packages, or what is easily built from generic code modules. In this environment, specialized software tasks such as one-off "what if" market analysis and filling specialized customer requests that require unusual data analysis typically have strong expense and time disincentives.

Of course, there have been attempts to change this system. Perceiving lucrative opportunities, a marketing approach by some software houses to the problem has been specialization in providing software "tools" (i.e., the software used to create software). Another impetus for change has been reducing the time to completion and the complexity of very large computer projects. Of particular note here are academic and government groups which have adopted a "we are big enough that we can do anything" organizational approach, and have attempted to either create better software tools themselves, or to pseudo-legislate better tools into existence (often by imposing "procurement" standards on their suppliers). Unfortunately, almost all of these software improvement efforts have focused on supplying tools more suitable for existing software specialists, than for end software users. The previously mentioned code modules are usually examples of this. Further, such organizational efforts to date are generally conceded to be marginal successes, at best. Examples include once greatly hailed programming advances such as structured programming, in the 1970's, and object-oriented programming, in the 1980's. Third generation languages from these eras, such as C and C++, are not being replaced by later generations. Fourth generation languages today remain something inflicted on university Computer Science majors for one semester, and the only major fifth generation language development project, to date, has become an embarrassment to the government that funded it. The ultimate critics, however, are software end users, and in their general perception even notable successes like spreadsheets and structured query language ("SQL") data bases remain too expensive, too inflexible, and too unmodifiable, when all the hardware, software, and personnel factors are summed up.

Software users want tools which they can use to easily write and modify software themselves. Complex programming languages, regardless of how powerful they are, are simply not acceptable. Users want the mathematical power of spreadsheets and the data access power of SQL, without the generally high "learning curve" that even these software tools often carry today.

DISCLOSURE OF INVENTION

Accordingly, it is an object of the present invention to provide a system with which relatively unsophisticated computer users can themselves program and modify software to perform sophisticated applications.

Another object of the invention is to provide a system for easy and trustworthy software creation and modification. Ease of use requires, implicitly, that users not encounter a burdensome "learning curve" when applying the invention. While, in this context, trustworthiness is one way of expressing the goal that the invention minimize or eliminate both system errors and "human errors" caused by the nature of the system. To illustrate this last goal, consider the negative example of counter-intuitive programming languages like C and C++, and the human errors (i.e., programming errors) common when using them.

And, it is an object of the invention to provide an applications software creation and maintenance system which does not require compiled code to be recompiled to accomplish any modification.

Briefly, a preferred embodiment of the present invention is, within a generally conventional computer system which accesses a SQL data base, providing user-programmer data defining and formula step entry capability, and further providing pre-programmed capability to execute the formula steps on the data definitions. The data defining capability is generally conventional. It permits user-programmers to define entirely conventional and well understood data representations like constants and variables. Further provided within this data defining function is the ability to define business object representations of data in SQL data bases. Business objects, described elsewhere herein, while also a conventional data format, are not yet so widely known. However, it can be said that business objects are widely understood, since they are closely analogous to the manner in which most computer users actually think about the data they work with. It should be noted that variables may be defined to contain conventional single data elements or multiple data elements in the manner of business objects. The formula step entry capability permits user-programmer entry, storing, and editing of formula steps containing one or two operands, an operation to be performed on those operands, and a result field, which defines where data should be put (or "mapped") after it is calculated or moved by carrying out the operation. Under largely automatic but user overrideable control, the formula steps are grouped into sequences and stored as a formula representing a computer task. The pre-programmed capability to execute such formulas on dynamically changing business objects in SQL data bases is a key feature of the invention. By inclusion in the invention of the previously compiled program code modules for the operations to be performed, no compilation of the user-programmer entered formulas is ever necessary. At execution time the invention loads at least a formula step, and more typically at least an entire formula, consisting of many formula steps, then parses each formula step into its respective operands, operation and result field. Then the data represented by the operands (regardless of its constant, variable, or business object nature) and the pre-programmed operation code module associated with the operation in the formula step are loaded. The loaded pre-programmed code is then performed (i.e., executed) on the loaded data, and the result is stored in the location represented by the result field. All of the formula steps in a formula are similarly processed, so that ultimately the task represented by that formula is completed and the results for that task are available in the SQL data base.

An advantage of the present invention is that users with very little grasp of computer programming methodologies can develop systems to calculate virtually anything of a mathematical nature once they can identify within their SQL data base the source of data to be used, a target location for the result, and the fundamental mathematical operations needed to derive the result. No knowledge of any specific programming language is required. Further, the present invention may have integrated into it common database tools which minimize any need for the user to even grasp computer system methodologies. For example, working with an existing SQL data base, a user need have no understanding of data files and locations, as contrasted with data identifiers.

Another advantage of the invention is that business objects may be used as data sources and targets in the user written programs. Thus fourth generation language and object-oriented programming type capabilities are provided and may be easily applied by unsophisticated applications programmers.

And another advantage of the invention is that major storage components of the invention can be implemented in SQL data bases, thus minimizing the need for specialized storage, and permitting the invention to itself benefit from the ease and power of SQL data base storage. Examples of such components include all work area and all libraries (e.g., formula libraries, formula group libraries, formula class libraries, and even code modules libraries).

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIG. 5a is a block diagram depiction of a work area within the SQL data base of FIG. 4 which shows data loaded prior to execution by the invention, while FIG. 5b is a block diagram depiction of the same work area within the SQL data base after execution by the invention;

BEST MODE FOR CARRYING OUT THE INVENTION

Figure 1:
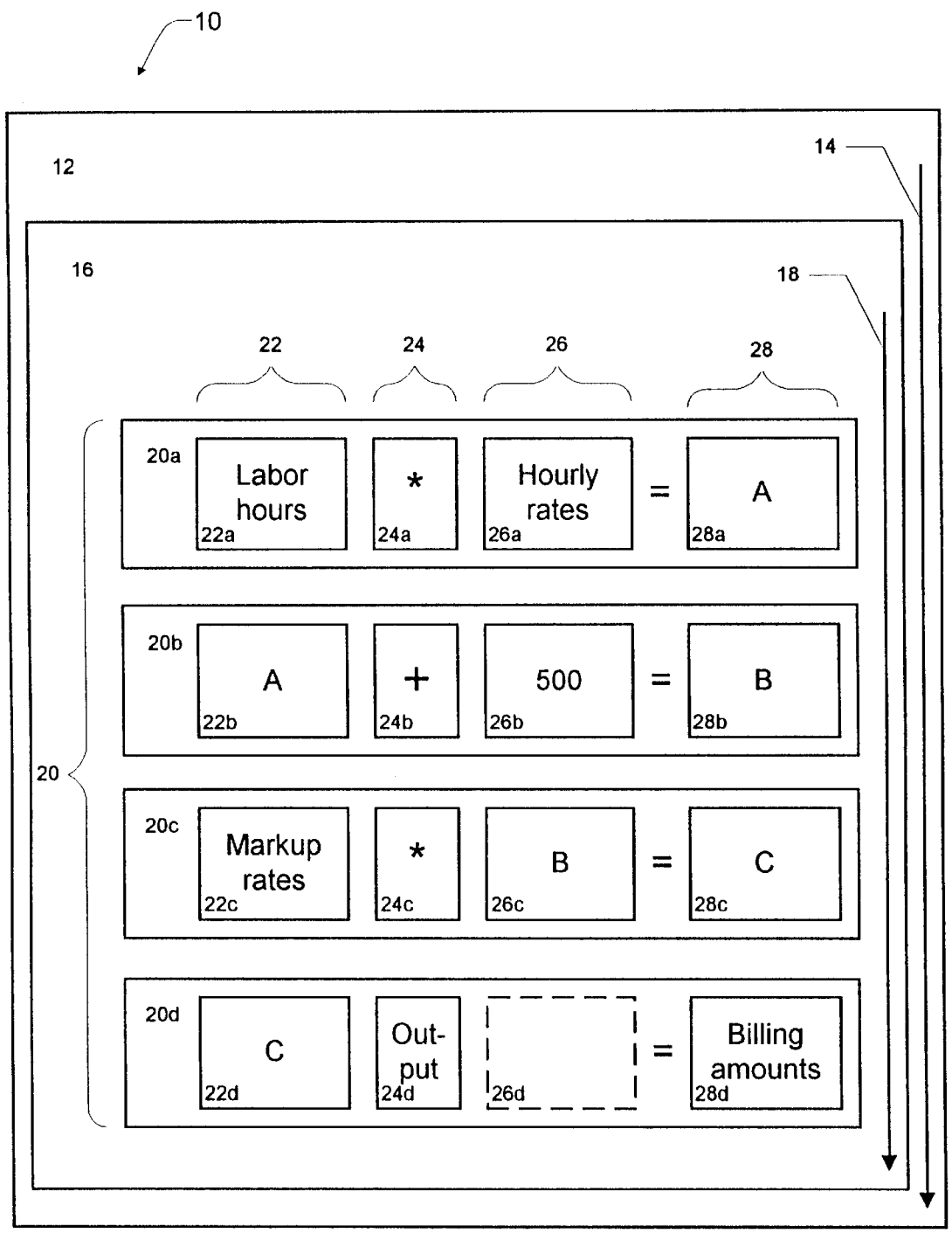
FIG. 1 is block diagram depiction of a program ready for the invention to execute.

The preferred embodiment of the present invention is a system for programming and using a computer to perform mathematical operations on the contents of structured query language ("SQL") data bases. The programmed operations may be run on the same or on an entirely different computer than the one used for programming. As illustrated in the various drawings, and particularly in the view of FIG. 1, a preferred embodiment of the invention is depicted by the general reference character 10. The present invention 10 is first described here in a "running" scenario, and then in an "as programmed" scenario.

Formula groups 12 represent collections of related tasks which users wish performed. For example, it might be desirable to process billings for labor, materials, and bonuses at the same time for one client. Each formula group 12 has a group sequence 14 for the elements it contains. This is because in most mathematical operations the sequence of operation is important. Obviously, it would be unacceptable to attempt a calculation using an output from another step which had not yet been performed.

Figure 2:
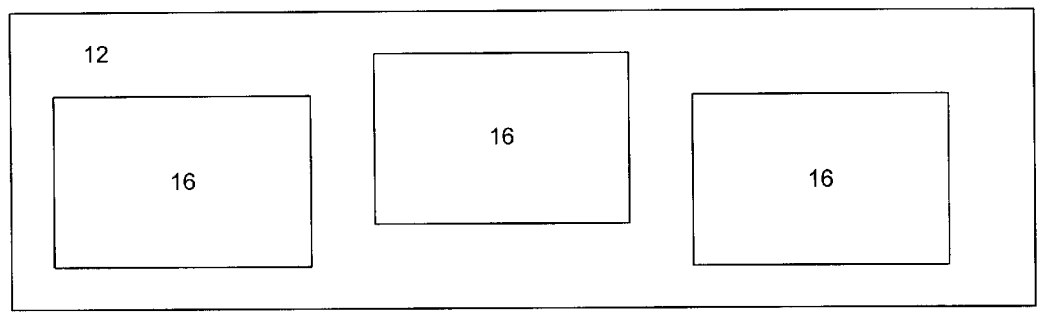
FIG. 2 is block diagram depiction of the inventions use of formula grouping to form a library of a plurality of formulas.

The elements within a formula group 12 are one or more formulas 16. FIG. 2 depicts a formula group 12 with a plurality of formulas 16 collected therein, while FIG. 1 depicts only one formula 16 in a formula group 12. Continuing with the previous example, respective formulas 16 would each be used to represent the equations used to calculate labor, materials, and bonuses. For reasons similar to those for formula groups 12 and group sequences 14, each formula 16 requires a formula sequence 18. Within formulas 16 are formula steps 20, each representing basic operations that must be performed to calculate the desired formula 16. Finally, at the most elemental level, each formula step 20 contains a set of tokens which includes: a first operand token 22, an operation token 24, a sometimes optional second operand token 26, and a result token 28. FIG. 1 illustrates these basic structural elements of the invention 10 in the context of a typical accounting calculation using a formula group 12 having only one formula 16, which includes four formula steps 20a–d.

Figure 3:
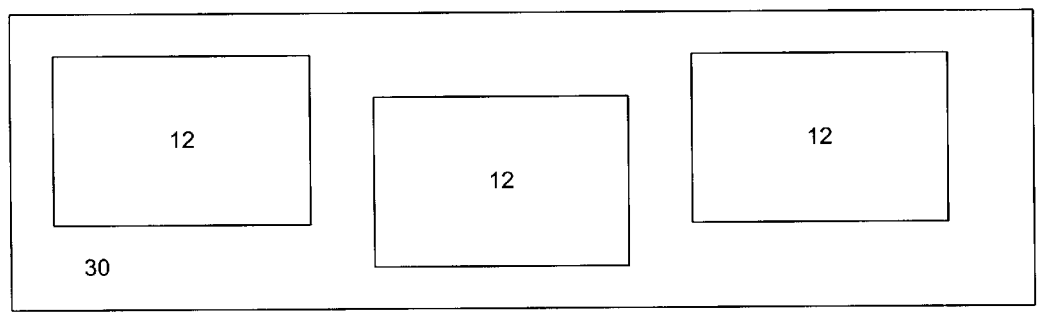
FIG. 3 is block diagram depiction of the inventions use of formula classification to form a library of a plurality of formula groups.

It should be appreciated that even higher levels of classification than formula groups 12 are easily possible. For example, formula classes might be formed for all monthly or annual billings. FIG. 3 depicts an example of this concept.

There an implementation of the invention 10 provides for a user defined formula class 30 that contains a plurality of formula groups 12. However, including capability for any additional classification beyond the formula 16 level is not a necessary part of the invention 10, and such extensions would be obvious in view of conventional software development practices.

Formula groups 12 will not be extensively discussed here, since they are a relatively obvious extension of formulas 16, and theoretically, for very simplistic implementations of the invention 10, could even be optional. In addition to the already pointed out benefits of grouping related applications, a purpose of formula groups 12 is to hide the complexity of related tasks. As noted, for each formula group 12 a group sequence 14 is required, although it may often be unnecessary, since unrelated data may be used by the formulas 16 in a formula group 12. One rationale for this requirement is facilitation of formula group 12 maintenance, as well as expansion by addition of formulas 16. For example, initially a formula group 12 might not need a group sequence 14, but later modifications might easily create such a need. Further, users programming such modifications might not readily appreciate the relationships of earlier programmed formulas 16 to new formulas 16.

Formulas 16 hide the tedious complexity of formula steps 20, and permit users to concentrate on the ultimate tasks that formulas 16 perform, rather than individual steps into which they are broken down. Group sequences 14 are usually necessary, since the individual formula steps 20 are primarily used to perform basic mathematical operations which must follow the basic laws of mathematical operational precedence (e.g., A+B/C=D produces different results if the step B/C is done before A+B). FIG. 1 portrays a formula 16 to perform the simple accounting calculation:

Markup Rate * ((Labor Hours * Hourly Rates)+500)= Billing Amount. Calculating the billing amount is the ultimate task in this example, and therefore this equation is a convenient subject for a formula 16.

To calculate the example equation it may be broken down into the more basic equations:

Labor Hours * Hourly Rates=A

A+500=B

Markup Rate * B=Billing Amounts and, for reasons which will be discussed below, it is preferable to actually perform the basic equations:

Labor Hours * Hourly Rates=A            {20a}

A+500=B                                  {20b}

Markup Rate * B=C                        {20c}

C[OUTPUT]=Billing Amounts.               {20d}

These basic one and two operand single task steps are suitable for representation as formula steps 20. This is depicted in the example formula 16 in FIG. 1, where formula steps 20a–d are shown.

This concept of breaking complex mathematical operations (i.e., formulas 16) down into basic equations (i.e., formula steps 20) which are performed sequentially (i.e., in a formula sequence 18) is intentionally structured to mimic the operations and syntax that a human would use when solving the same task with a pencil and paper. Thus, formula steps 20a–c are close analogies to steps a human would use to solve this example. And, if a human user wanted to fill out an invoice including the calculated billing amount, even formula step 20d has a human solution step analogy. In the example, A, B, and C are variables used to carry intermediate results from one formula step 20 to the next, much as a human would use scratch paper. As noted, the invention 10 provides for a defined formula sequence 18. This provides a means to avoid the nonsensical case of calculating formula step 20b (A+500=B) prior to calculating formula step 20a (Labor Hours*Hourly Rates=A).

A key aspect of the present invention 10 is that the individual fields within formula steps 20 contain mere tokens. First operand tokens 22 and second operand tokens 26 may represent constants, variables, or business objects. An important point, however, is that such tokens are not the data itself (excepting, arguably, constants), and the data itself may change, or may not even exist until the actual time of formula group 12 execution. To a limited extent an analogy to the pass-data vs. pass-a-pointer-to-data distinction in programming languages like C or C++ may be helpful, except that in the present invention 10 what are really created and passed are identifiers of data sets that will later be used to retrieve or store the actual data at execution time.

At this point some discussion of business objects is appropriate. They are a known art, but of a type many computer users are still unfamiliar with. In the following discussion a "business object" is a set of related data created (or more properly thought of as "collected," since the data must already exist somewhere) at formula group 12 execution time. Business objects are sub-sets of global data in a SQL data base. Business object definitions are so commonly used, reused, and edited into new business object definitions that libraries of business object definitions are commonly built and maintained within SQL data bases. For the following discussion it must always be kept in mind that business objects only "exist" at formula group 12 execution time. Business objects are very dynamic. As the operational data of an organization ebbs and flows, the contents of actual business objects will vary considerably as they are created again and again from stable business object definitions. Thus, in the example in FIG. 1, a Labor Hours token 22a is provided which represents a business object that will contain all of the labor hours that employees work on a specific project. Although not shown in FIG. 1, use of the Labor Hours token 22a there presumes the existence in a SQL data base somewhere which contains at least employees and hours-worked data (see e.g., FIG. 4). This global data set in a SQL data base may have a number of "dimensions," including an hours dimension, an employees dimension, and a project dimension for the example used here. Most global data in a SQL data base may also be classed by using the common SQL dimension know as "timespan." Timespan may be used to create business objects containing data for specific time periods of a day, week, month, quarter, etc. Because timespan is such a conventional SQL data base concept, it will not be discussed further, or used in any examples here.

Individual business object may typically contain one "value." for example, representing only one employee. Or, they may contain thousands or even more values, possibly representing employees on a large project. In the present example, a first operand token 22c for markup rates in FIG. 1 represents a business object which will have only one value at formula 16 execution time, because only one markup rate value is currently being used there for all work on the relevant project. Theoretically, a business object could also be empty, but that might cause errors. "Error handling" to address such situations is well known general programming art, and will not be covered in detail here.

Returning now to the tokens contained in formula steps 20, the choice of operation token 24 determines the number, one or two, of operand tokens necessary (results are not classed as operands in this discussion). With the exception of an OUTPUT operation, all operation tokens 24 are for fundamental mathematical operations which use either one or two operands. For example, addition is a dual operand operation (e.g., A+B=C has the two operands of A and B). In contrast, square root may be represented as either a single operand operation (e.g., $\sqrt{A}$=C, where A is the single operand) or a dual operand operation (e.g., $A^B$=C, where B=0.5, and A and B are the two operands). However, the square root single operand form is understood by more users, and is therefore probably preferable.

Typical operations envisioned by the inventor to be included in implementations of the present invention 10 include addition, subtraction, multiplication, division, power of (e.g. $10^3$), various limit operations (e.g., OBJECT;>; 100=RESULT, for a "capping" function to use OBJECT for the RESULT if less than 100, but use 100 for the RESULT if OBJECT is greater than 100), and an OUTPUT operation to transfer (i.e., "output") the contents of an object represented by a first operand token 22 into an SQL data base. In some implementations of the invention 10 this OUTPUT operation might even be the default case when no operation token is given, i.e., a NONE operation. Further, it should be appreciated that alternate embodiments of the invention 10 might include a variety of other operations, and accordingly the scope of the present invention 10 should be construed broadly. A few possible examples include factorial, absolute value, and the already discussed square root operation.

In a conventional programming language like C or C++ a skilled programmer would write and compile a statement like "x=y+z;" which upon execution of the compiled code would always add "y" and "z" and store the result in "x." Unfortunately, to change this to multiply "y" and "z" together to derive "x" would require that the skilled programmer rewrite the line of code and then recompile it. In contrast, the present invention avoids this classic modification and maintenance problem by using a library of already compiled code modules for operations which it performs. Within individual formula steps 20, which token for the operation token 24 is chosen during programming is irrelevant, aside from specifying one for which an equivalent executable code module will be present at execution time, and one with the right number of operands. If a user-programmer chooses a token for addition during programming, then addition is later performed at formula 16 execution. If a token for multiplication is chosen, multiplication is later performed. And, if a token for "δ" is chosen, then a code module represented by "δ" is later performed. It should be noted that a code module, thus, need not even have been written, nor its inner workings clearly understood at applications programming time. Further, it should also be appreciated that since programming and execution may occur at widely different times, and on widely different computer equipment, that this tokenized treatment of operations provides benefits such as formula 16 and even formula step 20 portability.

Result tokens 28 represent where the results of operations performed on the data represented by the first operand token 22 and any second operand token 26 are placed. In the preferred embodiment, result tokens 28 will usually represent variables. In which case they may be either a single value, termed here a "simple variable," or they may be a variable equivalent to a business object (i.e., containing multiple related values), termed here a "complex variable."

The exception situation, when a result token 28 will not represent a variable, is when the result token 28 represents an output business object. An example is the result token 28d, which represents a Billing Amounts business 10 object. While the invention 10 could easily be implemented without using a separate OUTPUT type operation token 24, providing one facilitates use of the invention 10 with highly dynamic SQL data bases and multi-processor environments, and enforces a degree of data protecting discipline on users of the invention 10.

Figure 4:
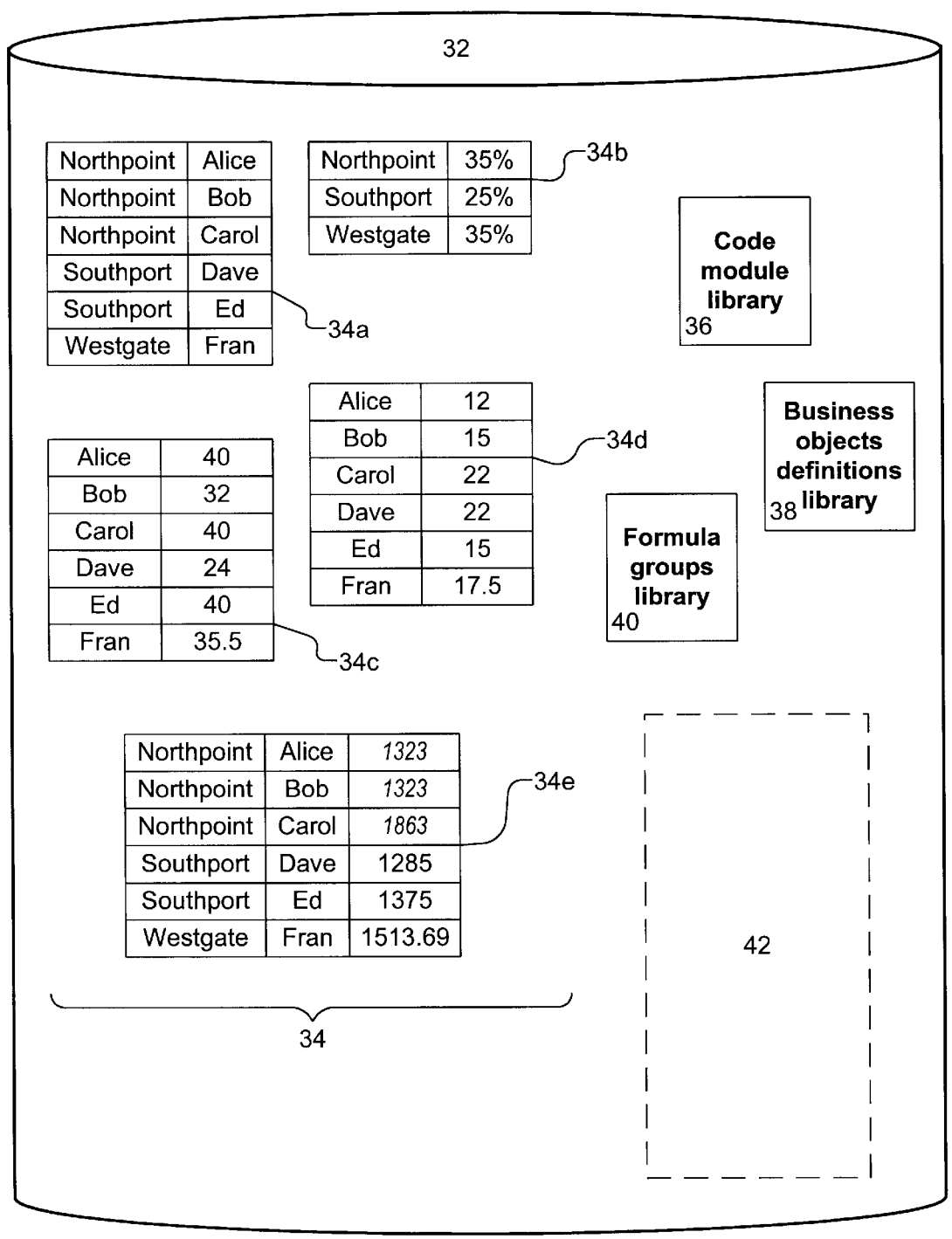
FIG. 4 is a block diagram depiction of a SQL data base containing data which the invention would use when executing the program of FIG. 1.

FIG. 4 depicts a SQL data base 32 containing global data 34 which the present invention 10 might be used to perform operations on, a code modules library 36 which contains part of the executable program code used by the invention 10, a business object definitions library 38, and a formula groups library 40 of previously programmed formula groups 12. A number of individual data items are stylistically depicted as included in the global data 34, these include: a Project-Employee table 34a; a Project-MarkupRate table 34b; an Employee-Hours table 34c; an Employee-HourlyRate table 34d; and, a Project-Employee-BillingAmount table 34e which further stylistically depicts in italics form some values which will only be current upon execution of our example. The code modules library 36 includes at least: a multiplication module 36a, an addition module 36b, and an OUTPUT module 36c (shown in FIG. 5a–b only). Similarly, the business object definitions library 38 includes at least: a Labor Hours business object definition 38a, a Hourly Rates business object definition 38b, a Markup Rates business object definition 38c, and a Billing Amount business object definition 38d (also shown only in FIG. 5a–b).

The invention 10 may be perceived as working in at least two stages. In the first stage a work area 42 (shown in ghost form in FIG. 4), of sufficient size for execution of at least one formula group 12, is allocated in the same storage used for the SQL data base 32. Then the actual executing of the formula group 12 is undertaken, using the now loaded executable code on the now loaded data.

Figures 5A, 5B:
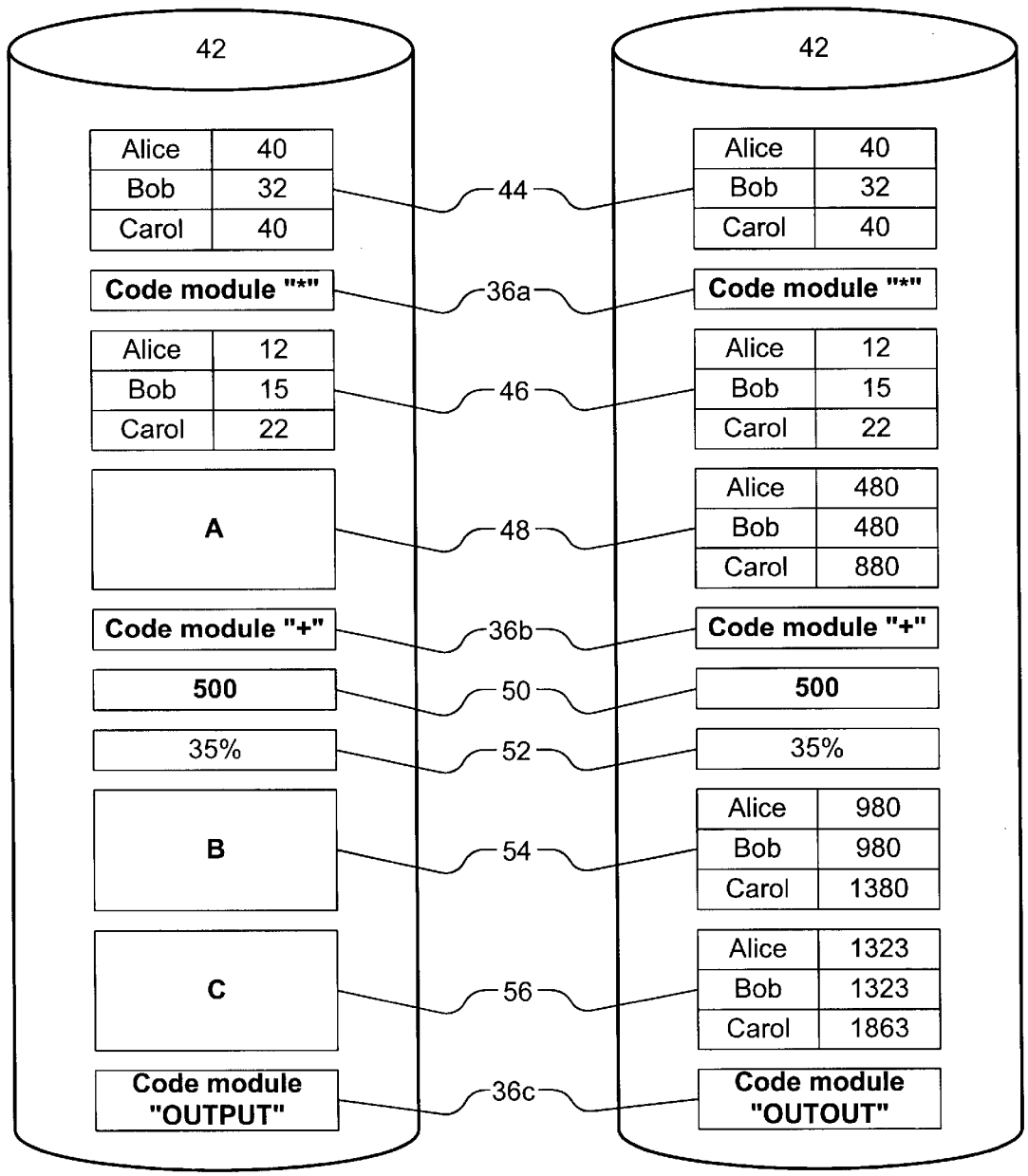

FIG. 5a depicts the work area 42 at the end of the first stage, after it is loaded but before any execution of the formula 16 within the formula group 12 has occurred. In the first stage the formula group 12 containing the formula 16 is read, and each formula step 20 is parsed into constants, variables, business objects, and operations tokens. Then any necessary input data is loaded into the work area 42. The order of representation of formula step 20 fields within the work area 42 is irrelevant, except that for each formula step 20 the result token 28 must be processed last, for reasons which will become obvious below. The top to bottom representation used in FIG. 5a–b intentionally mimics a conventional mathematical field ordering (e.g., A+B=C) because most readers will be familiar with such, but the invention 10 could just as easily use a Reverse Polish notation scheme (e.g., AB+C=), and other schemes are also possible.

To parse formula step 20a, the invention 10: (1) interprets the Labor Hours token 22a, loads the Labor Hours business object definition 38a from the business object definitions library 38 in the SQL data base 32, and then creates a Labor Hours business object 44 in the work area 42; (2) interprets the operation token 24a, and loads a copy of the multiplication module 36a from the code modules library 36 in the SQL data base 32 into the work area 42; (3) interprets the Hourly Rates token 26a, loads a previously created Hourly Rates business object definition 38b from the business object definitions library 38, and creates an Hourly Rates business object 46 in the work area 42; and, (4) interprets the result token 28a, and creates a variable "A" 48 in the work area 42.

It should be noted that the first instance of each variable within a formula group 12 must occur in a result token 28, since any variable first occurring in an operand would be "un-initialized" (i.e., an improper usage, which could result in errors during execution). It should now also be clear that a result token 28 can not be processed until the first operand token 22 and the second operand token 26 have regions of the work area 42 allocated for the objects (e.g., including business objects and complex variables) which they represent, since only then will the actual size of all possible result objects be determinable.

Parsing of formula step 20b proceeds in somewhat similar manner: (1) since a variable "A" 48 exists, nothing further need be done for the variable "A" token 22b now; (2) for the operation token 24a, a copy of the addition module 36b is loaded from the code modules library 36; (3) for the constant "500" token 26b, a constant "500" 50 is created and loaded with the value 500; and, (4) for the result token 28b, a variable "B" 54 is created.

Formula step 20c is similarly parsed into: (1) a Markup Rates business object 52 based on a previously created Markup Rates business object definition 38c, for the Markup Rates token 22c; (2) nothing further for operation token 24c, since an instance of the multiplication module 36a is already loaded; (3) nothing further for variable "B" token 26c, since variable "B" 54 exists; and, (4) for the result token 28c, a variable "C" 56 is created.

Finally, formula step 20d is parsed by: (1) doing nothing further for variable "C" 56, since it already exists; (2) loading a copy of the OUTPUT module 36c from the code modules library 36; doing nothing for the absent second operand token 26d, since it does not exist, is not needed, and is being noted and depicted in ghost form in FIG. 1 only to emphasize its absence; and, (4) loading a previously created Billing Amount business object definition 38d. It should be noted that within the work area 42 the variable "C" 56 is effectively a Billing Amount business object, and thus the Billing Amount business object definition 38d is being used here to map or copy it (i.e., output it) into the SQL data base 32.

At this point the first stage of formula group 12 execution is complete and the second stage may begin. FIG. 5b depicts the work area 42 after the second stage is finished and the formula group 12 has been completely executed. In FIG. 5b we see that variable "A" 48, variable "B" 54, and variable "C" 56 which were empty in FIG. 5a now contain calculated data. Further, at this point the Project-Employee-BillingAmount table 34e in the SQL data base 32 depicted in FIG. 4 has now been updated, and the data shown there in italics form will at this point have actually been calculated and placed there.

Until now there has been no detailed discussion of copying or "mapping" data into the work area 42 to create business objects, or of copying data out of business objects in the work area 42 to save results in the SQL data base 32. This is because these operations are generally conventional. Just as business objects are prior in the context of the more general art of SQL data bases, there is conventional art for creating or defining business objects for input to processing systems, and for saving business object contents that are output from such processing systems. While the inventor currently uses a proprietary mapping tool called Mass Change, because it is efficient and integrates well with the present invention 10, it should be appreciated that Mass Change is not necessary to work the present invention 10, and Mass Change will not be discussed extensively here.

As for any computer memory work area scheme, pointers to the individual contents of the work area 42 are stored by the invention 10 as the work area 42 is accessed, for use at processor execution time. In this regard the invention 10 uses much the same system as all computers, and accordingly the invention 10 can be implemented on conventional computer hardware. To execute a formula step 20 loaded in the work area 42 three pointers to application data and one pointer to an executable code module in the work area 42 are passed to the processor (note that if the formula step 20 is for a single operand operation even one of these data pointers may be eliminated, filled with a null pointer, or simply exist but be ignored). This is somewhat analogous to how traditional C language code like:

```
int x, y, z;
    ... /* Initialize x and y to some values */
z:=add(&x, &y);
``` where "add" has been previously defined as:

```
int add(int *px, int *py)
{
    return *px + *py;
}
``` would be executed. Pointers to x, y, and to a code module (here the defined function "add") would be passed within the processing computer system for execution and placing the result in z. In a similar manner, at final execution the invention 10 may be implemented to merely pass pointers to the computer hardware executing it, with the only real difference being that here the data being used may be business objects, and, if so, the executable code module being pointed to must be capable of processing such business objects. This underlying concept of passing data and code pointers is so conventional and so fundamental to computer systems today that it will not be discussed further.

Figure 6:
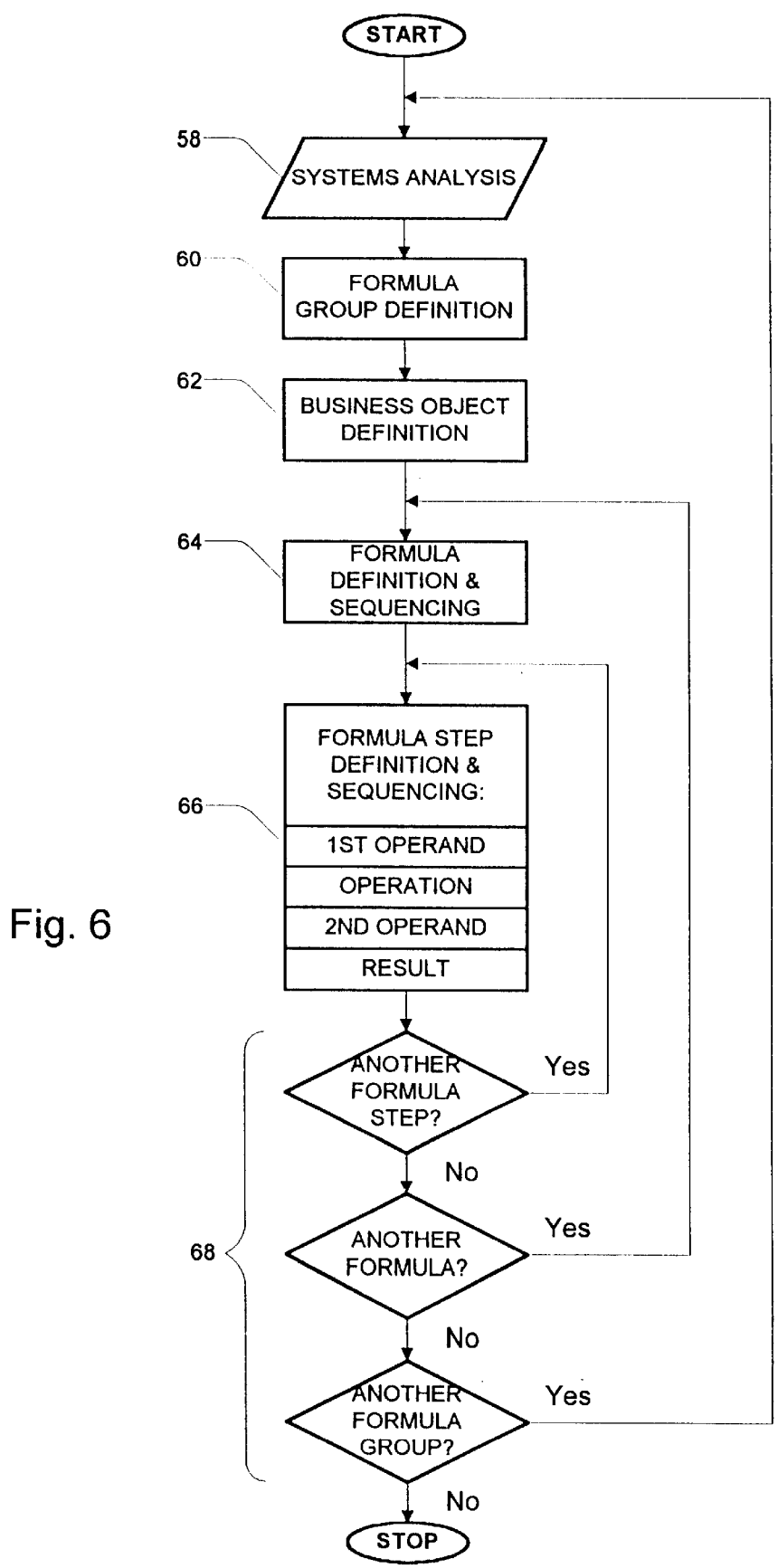
FIG. 6 is a flow chart of the operation of programming the invention.

FIG. 6 is a basic flow chart of programming the invention 10. The first step, Step 58, is a human operation, not performed on or with the invention 10. In creating a totally new application the user-programmer preparatory to programming the invention 10 must perform the essentially conventional step of system analysis, where one defines the desired result and the available resources to accomplish that result. Constants and simple variables are conventional programming data elements which anyone familiar with simple mathematics can easily handle, the real task here is to define business objects which the invention 10 will use as inputs and outputs. As noted above, in the usual scenario a user will first have an idea what output business object is desired (i.e., what "result" or new data is to be put into a SQL data base 32). A user then decides what input business object definitions (i.e., the "available resources," which may be dynamically changing data in the SQL data base 32) can contribute to finding the output business object. Next a user creates a rough formula using tokens for these business object definitions, and considers whether any constants are needed. These system analysis sub-steps are likely to be merged together in the mind of the user, and often iterative refining is part of this mental process, until a formula like:

Markup Rate * ((Labor Hours * Hourly Rates)+500)= Billing Amount is ready to be taken from the mental or pencil and paper stage to programing as a formula 16.

Although somewhat arbitrary, Step 60, defining a formula group 12, is next. In most implementations of the invention 10 it is anticipated that "ownership" of a formula group 12 will be definable. In the context of a SQL data base 32, addressing questions of who will control specific resources (e.g., individual formula groups 12) is desirable at an early point in programming. Further, in many SQL data base implementations it is a requirement that all resources be "owned," and that any resource which is added to the SQL data base will thus have to have some ownership assigned, even if it is a mere default ownership. In such cases initial creation is the best time to assign the ultimate ownership, rather than having to return and correct it later. At the time that a formula group 12 is defined other, optional, fields can also be filled in. For example, it is anticipated that most implementations of formula groups 12 programming will provide a description field, to facilitate internal program documentation.

The next step, Step 62, is defining the input and output business objects. While the invention 10 merely needs tokens for the first operand token 22, second operand token 26, and result token 28 before actual formula 16 execution, it is nonetheless desirable to force users to define all business objects before allowing formulas 16 or formula steps 20 to be created. In this manner the business object definitions library 38 can be accessed for error checking, and it can be updated by the invention 10 as programming proceeds. For example, it is desirable to discover a human error like using "Proj-rate" in place of "Proj_rates" early, rather than letting this error consistently be programmed, only to be discovered at the first execution of a formula 16 that includes it. As previously noted, various conventional SQL business object tools exist, including proprietary tools such as the previously mentioned Mass Change utility. Implicit in this concept of mapping data into and out of business objects is the ability to define tokens which represent the business objects. It is such tokens which are then used by the invention 10 as first operand tokens 22, second operand tokens 26, and result tokens 28.

In addition to ownership of operational resources like formula groups 12, another key point that needs to be addressed early in programming is ownership and security of data resources (e.g., business objects). In most modern computer systems a question arises of who "owns" the data, and whether access to it is permitted or even possible. Therefore, it should be kept in mind that within SQL data bases there are often multiple instances of the same data, or multiple resources from which it can be derived, and accordingly early planning should address which sources are realistically accessible. For example, an accounting and a marketing department may essentially duplicate some data, but it can be anticipated that obtaining permission to access the marketing department's data "property" will in some cases be easier. For simplicity, it is also desirable that all input and output business object concerns be addressed at one time. For example, forgetting to set access controls during development of an application using a new business object could lead to the obviously undesirable possibility of a shipping clerk accessing earnings for members of a sales department. Thus, in most implementations of the invention 10 it is anticipated that Step 62 will be a single step, rather than being broken up into multiple steps.

In Step 64 a user defines a formula 16 to go into the formula group 12 specified in Step 60. The user must provide an identifier for the formula 16, as well as its group sequence 14 position. In the case of the group sequence 14, this can be generated automatically by the invention 10, but in typical implementations of the invention 10 users will also be provided an ability to specify or override generated values. An optional description field may also be provided here, to facilitate formula 16 level internal program documentation.

Finally, at Step 66, the user-programmer enters information for the calculation designed in Step 58. Similar to formulas 16, either the user or the invention 10 acting automatically must specify the formula sequence 18 position for each formula step 20. Other required elements in each formula step 20 are: a first operand token 22; an operation token 24, which may be provided either by entering the token or by selecting one from a menu of available ones; a second operand token 26, if the chosen operation requires one; and a result token 28. If all business objects have been previously defined, the only tokens which should ever be unrecognized by the invention 10 at this point are result tokens 28 for first instances of variables. This facilitates strong error checking. For formula steps 20 individual identifiers may be made optional, since formula steps 20 are so basic in nature that referring to them in any manner other than by which formula 16 they are part of, and where they are in the formula sequence 18, may rarely be desired. However, even at this level it is anticipated that most implementations of the invention 10 will provide a description field, with which a programmer may document each formula step 20.

At Step 68, in FIG. 6, it is determined whether Step 66 needs to be returned to for another formula step 20, whether Step 64 needs to be returned to for another formula 16, or whether Step 58 and Step 60 both need to be returned to for another formula group 12.

Figure 7:
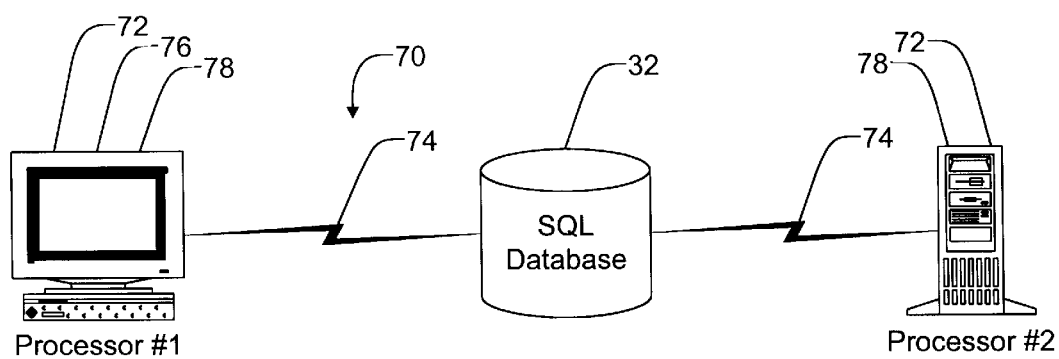
FIG. 7 is stylized depiction of a computer and SQL data base environment suitable for implementing the invention.

FIG. 7 depicts a computer system 70 implementing the invention 10. One or more processors 72 are provided which have communication links 74 to the SQL data base 32 of FIG. 4. If multiple processors 72 are provided, the respective operations of programming and executing the invention 10 can be distributed as desired. For example, programming duties only may be relegated to some processors 72, with execution duties only relegated to others. Or, of course, combined or proportional allocations of these duties may be assigned and performed on the processors 72. The processors 72 used for programming the invention necessarily include conventional data editing and selection capability 76, while processors 72 relegated to only invention 10 execution duties may omit this element. All of the processors 72 necessarily include data loading capability 78, to communicate with the SQL data base 32 over communication links 74.

In addition to the above mentioned examples, various other modifications and alterations of the flexible formula programming system 10 may be made without departing from the spirit of invention. Accordingly, the above disclosure is not to be considered as limiting and the appended claims are to be interpreted as encompassing the entire spirit and scope of the invention.

INDUSTRIAL APPLICABILITY

The flexible formula programming system 10 according to the present invention is adapted for use with conventional SQL data bases and both proprietary as well as conventional and widely available SQL tools for creating business objects. The invention 10 is well suited for improving the productivity of SQL data base applications programmers having skills across the entire spectrum from novice to expert. Further, at the less-experienced end of this spectrum, a great part of this productivity gain may be derived from reduced programming errors, due to the intuitive mathematical problem solving methodology employed by the invention 10. The invention 10 is easily embodied in programming environments that promote intuitive programming schemes, such as graphical user interfaces.

The invention 10 further reduces program development time and specialized skill needs to such degrees that entirely new programming applications are made possible. Examples including client requested one-off and customized projects, which in the past have typically been impractical due to organizational inertia when management has had to arbitrate between marketing departments with client satisfaction concerns, and information services departments pointing out that one-off data would be obsolete by ultimate delivery and that customization for single clients is too expensive.

For the above, and other, reasons, it is expected that the flexible formula programming system 10 of the present invention will have widespread industrial applicability. Therefore, it is expected that the commercial utility of the present invention will be extensive and long lasting.

I claim:

1. A programming system for users to program computers to perform mathematical and data transfer operations on data objects in SQL data bases, comprising:
   a) operation identifier selecting means, for choosing a representative operation identifier out of a menu of said mathematical and data transfer operations;
   b) result identifier selecting means, for choosing a representative result identifier from the set consisting of variables and said data objects, to receive the results of a said operation represented by a said operation identifier;
   c) operand selecting means, for choosing representative operand identifiers from the set consisting of said data objects, said variables, and constants, upon which a said operation represented by a said operation identifier is to be performed;
   d) formula step defining means, for constructing formula steps consisting of one of said operation identifiers, at least one and at most two of said operand identifiers, and one of said result identifiers; and
   e) formula defining means, for constructing formulas each consisting of sequenced instances of said formula steps.

2. The programming system of claim 1, further including:
   a) formula library means, for creating and accessing a formulas library of said formulas, to permit users to store, edit, and reuse previously programmed instances of said formulas.

3. The programming system of claim 2, wherein:
   a) said formulas library is made part of said SQL data base.

4. A computer system for programming and executing calculations on data objects in a SQL data base, comprising:
   a) a computer processor;
   b) program entry means, by which said processor may receive user programming of formulas, each said formula containing a sequence of formula steps, each of which include:
      1) at least one and at most two operand identifiers, representing an operand in the set consisting of constants, variables, and business objects in said SQL data base;
      2) an operation identifier, representing an operation which is in the set consisting of mathematical and data transfer operations; and
      3) a result identifier, representing a member of the set consisting of said variables and said business objects where a result calculated by executing a said operation on said operands is to be placed;
   c) temporary object allocating means, for allocating storage within said SQL data base for any said constants and variables referenced in said formula steps;
   d) data object loading means, for said processor to read from and write to said SQL data base; and
   e) an operation modules library of operation code modules, accessible by the computer system, for use by said processor to perform said mathematical and data transfer operations on said data objects, said variables, and said constants.

5. A method for users to program a computer to perform numerical calculations on data objects in SQL data bases, the method comprising the steps of:
   a) defining at least one formula, to represent a task which a user wishes performed;
   b) programming each said formula by:
      1) defining in a sequential order at least one formula step, representing fundamental operations necessary to perform said task;
      2) programming said formula steps by:
         a} entering a first operand identifier, representing a member of the set consisting of constants, variables, and said data objects in a said SQL data base;
         b} entering an operation identifier representing an operation in the set consisting of mathematical operations and data transfer operations;
         c} if said operation requires two operands, entering a second operand identifier, also representing a member of the set consisting of said constants, said variables, and said data objects in a said SQL database;
         d} defining a result identifier, to represent a member of the set consisting of said variables and said data objects, to be loaded with results of said operation.

6. The method of claim 5, further including:
   a) storing said formulas, to provide capability for execution of said formulas at other times, for execution of said formulas multiple times, and for retrieval and editing of said formulas.

* * * * *